(12) United States Patent
Kato

(10) Patent No.: US 11,961,306 B2
(45) Date of Patent: Apr. 16, 2024

(54) OBJECT DETECTION DEVICE

(71) Applicant: DENSO CORPORATION, Kariya (JP)

(72) Inventor: Kazuki Kato, Kariya (JP)

(73) Assignee: DENSO CORPORATION, Kariya (JP)

(*) Notice: Subject to any disclaimer, the term of this patent is extended or adjusted under 35 U.S.C. 154(b) by 381 days.

(21) Appl. No.: 17/486,224

(22) Filed: Sep. 27, 2021

(65) Prior Publication Data

US 2022/0012505 A1 Jan. 13, 2022

Related U.S. Application Data

(63) Continuation of application No. PCT/JP2020/013001, filed on Mar. 24, 2020.

(30) Foreign Application Priority Data

Mar. 28, 2019 (JP) ................... 2019-063664

(51) Int. Cl.
*G06V 20/56* (2022.01)
*G01S 7/48* (2006.01)
(Continued)

(52) U.S. Cl.
CPC ............ *G06V 20/56* (2022.01); *G01S 7/4802* (2013.01); *G01S 7/4863* (2013.01); *G01S 17/894* (2020.01);
(Continued)

(58) Field of Classification Search
CPC ...... G01S 17/42; G01S 17/931; G01S 7/4808; G01S 17/46; G01S 17/04; G01S 17/894;
(Continued)

(56) References Cited

U.S. PATENT DOCUMENTS 9,147,115 B2 * 9/2015 Teyssier ................. G06F 18/22
9,989,623 B2 * 6/2018 Send ........................ G01C 3/32
(Continued)

FOREIGN PATENT DOCUMENTS

JP   2005-090974 A   4/2005
JP   2005-329779 A   12/2005
(Continued)

OTHER PUBLICATIONS

Machine translation of JP-2010003091-A (Year: 2010).*
Machine translation of JP-2017150895-A (Year: 2017).*
Machine translation of WO-2018198729-A1 (Year: 2018).*

*Primary Examiner* — John Villecco
*Assistant Examiner* — Courtney Joan Nelson
(74) *Attorney, Agent, or Firm* — MASCHOFF BRENNAN

(57) ABSTRACT

In an object detection device for detecting an object, a single sensor unit includes a light emitting unit and a light receiving unit. The light receiving unit includes a two-dimensional array of light receiving elements and outputs a light reception signal in response to a light reception state of a set of the light receiving elements for each pixel. The sensor unit is configured to, based on the light reception signals, acquire first information indicating reception intensity of the reflected light at each pixel, second information indicating reception intensity of background light that is light other than the reflected light, at each pixel, and third information indicating a distance to the object at each pixel as a pixel value of the pixel. A detection unit is configured to use all of the first to third information included in the pixel values of the respective pixels to detect the object.

12 Claims, 11 Drawing Sheets

(51) Int. Cl.
  *G01S 7/4863*   (2020.01)
  *G01S 17/894*   (2020.01)
  *G01S 17/931*   (2020.01)
  *G06F 18/23*    (2023.01)
  *G06V 10/50*    (2022.01)
  *G06V 10/60*    (2022.01)
  *G06V 10/75*    (2022.01)

(52) U.S. Cl.
  CPC ............ *G01S 17/931* (2020.01); *G06F 18/23* (2023.01); *G06V 10/507* (2022.01); *G06V 10/60* (2022.01); *G06V 10/751* (2022.01)

(58) Field of Classification Search
  CPC ..... G01S 7/4802; G01S 7/4863; G06V 20/56; G06V 20/58; G06V 10/147; G06V 10/56; G06V 10/60; G06V 10/751; G06V 10/507; G06F 18/2185; G06F 2218/08; G06F 18/23; G06T 7/70; G06T 5/50; G06T 2207/10024; G06T 2207/10016; G02B 2027/0118
  See application file for complete search history.

(56)            References Cited

U.S. PATENT DOCUMENTS

| | | |
|---|---|---|
| 2007/0286475 A1 | 12/2007 | Sekiguchi |
| 2017/0242125 A1 | 8/2017 | Suzuki |
| 2020/0137373 A1 | 4/2020 | Iguchi |

FOREIGN PATENT DOCUMENTS

| | | | | |
|---|---|---|---|---|
| JP | 2010003091 A | * | 1/2010 | |
| JP | 2017150895 A | * | 8/2017 | ........... G01S 17/026 |
| WO | 2018/198729 A1 | | 11/2018 | |
| WO | WO-2018198729 A1 | * | 11/2018 | ............... G01C 3/06 |

\* cited by examiner

SECOND EMBODIMENT

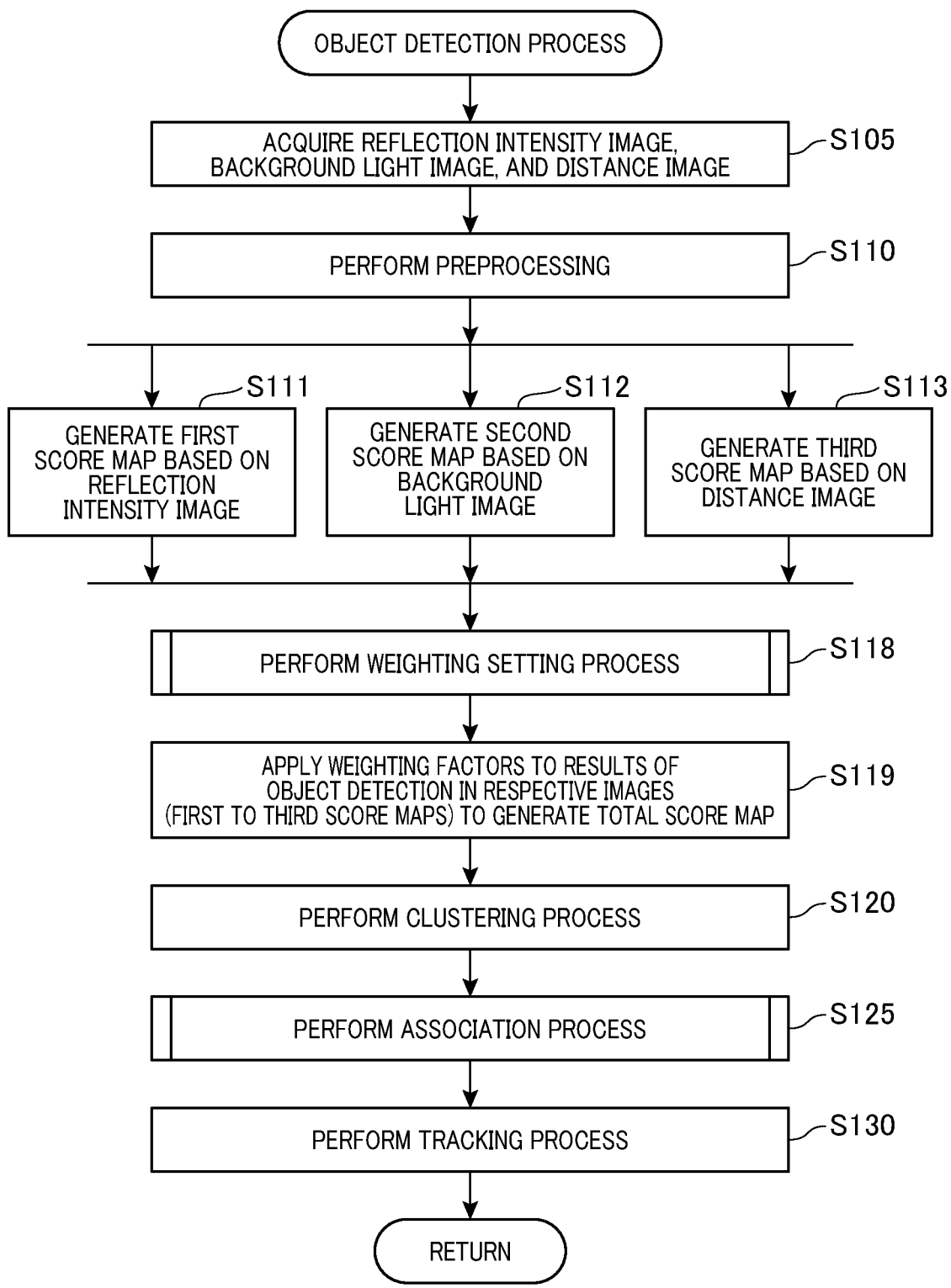

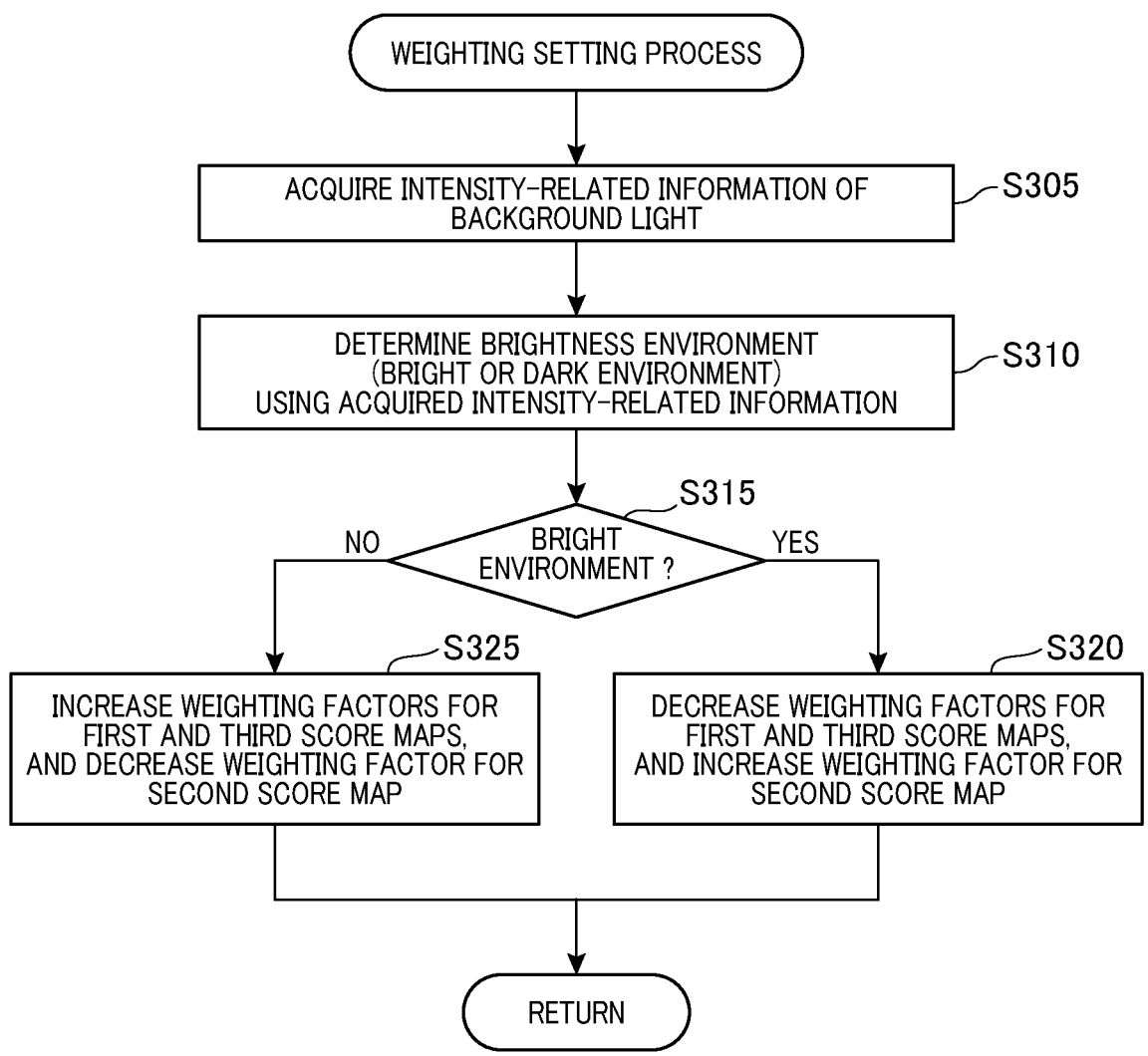

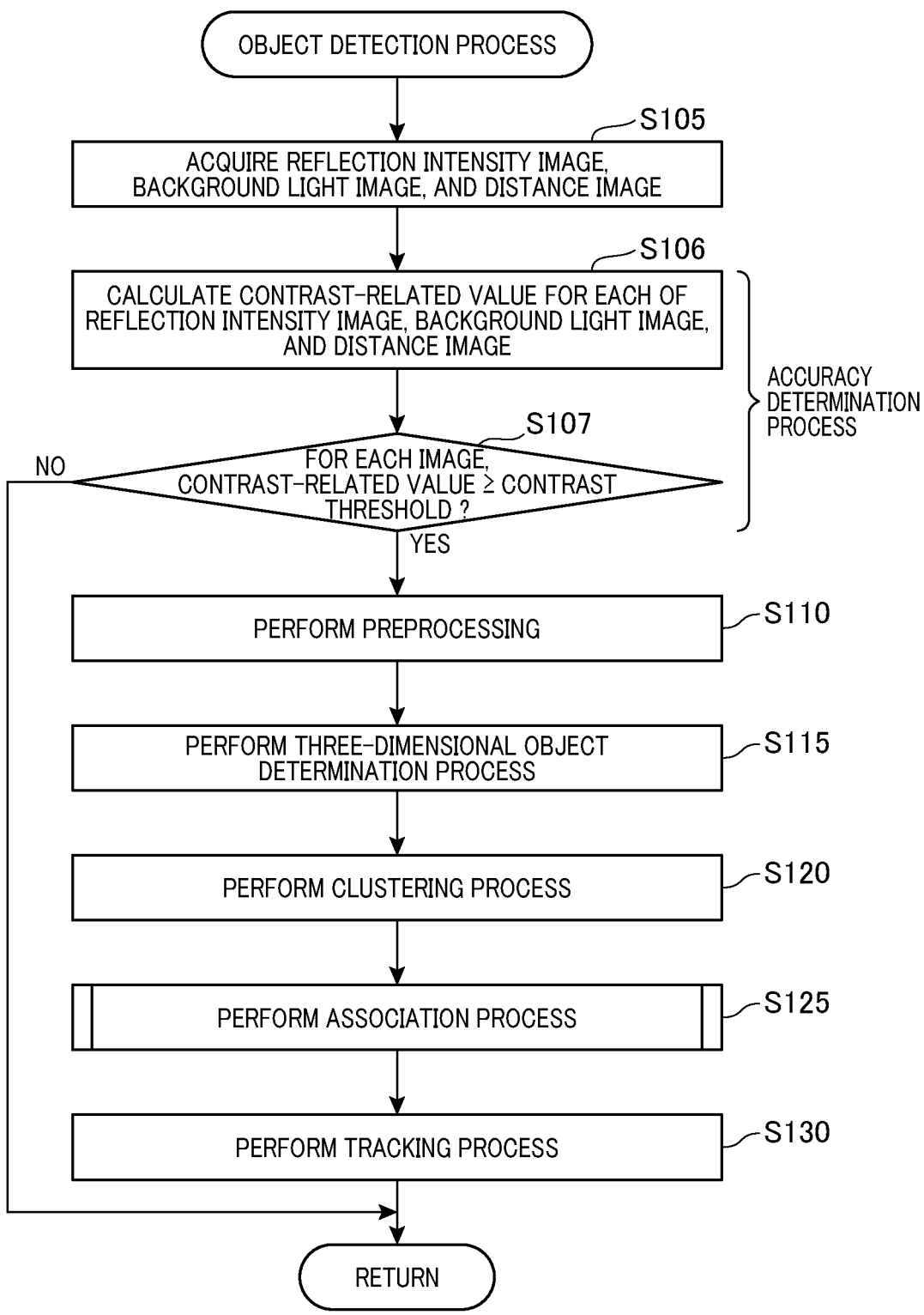

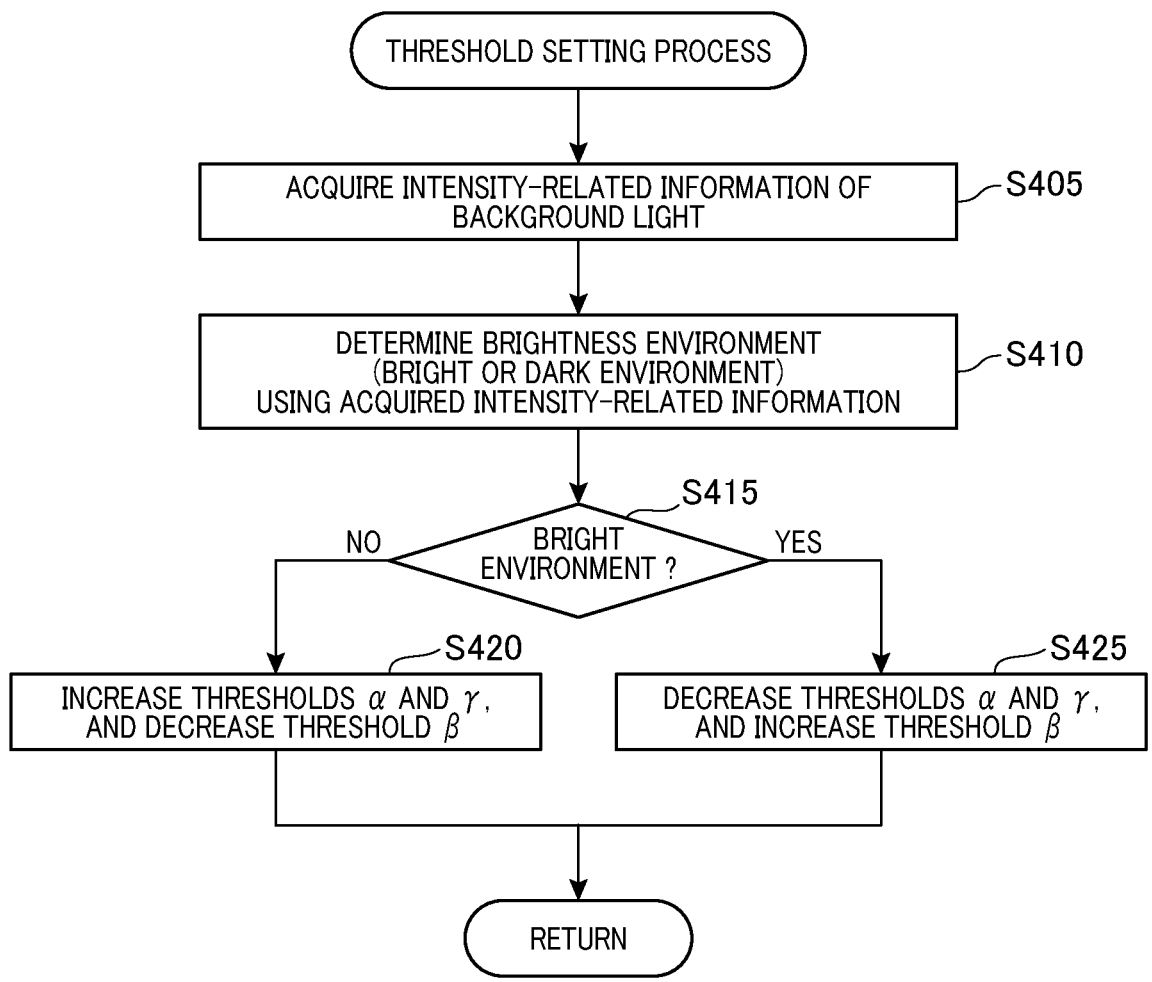

OBJECT DETECTION DEVICE

CROSS-REFERENCE TO RELATED APPLICATION

This application is based on and claims the benefit of priority from earlier Japanese Patent Application No. 2019-63664 filed Mar. 28, 2019, the description of which is incorporated herein by reference.

BACKGROUND

Technical Field

The present disclosure relates to an object detection device.

Related Art

In recent years, techniques for vehicle collision avoidance and vehicle driving assistance using vehicle mounted sensors, such as imaging cameras, a millimeter wave radar, and a laser radar (also referred as Light Detection and Ranging (LIDAR) are proposed. In these techniques, vehicle control, such as engine combustion control, steering control, braking control, is performed based on results of detection by the sensors. Among these techniques, a technique is known that calculates the probability of existence of each three-dimensional object based on detection signals acquired from a total of three sensors, i.e., a stereo camera, a millimeter wave radar, and a laser radar mounted to the vehicle, and combines the three acquired probabilities of existence of the three-dimensional object to acquire a total probability of existence of the three-dimensional object by so-called sensor fusion.

BRIEF DESCRIPTION OF THE DRAWINGS

In the accompanying drawings:

FIG. 9 is a flowchart of an object detection process of the second embodiment;

FIG. 10 is a flowchart of a weighting setting process of the second embodiment;

FIG. 11 is a flowchart of an object detection process of a third embodiment; and FIG. 12 is a flowchart of a threshold setting process of a fourth embodiment.

DESCRIPTION OF SPECIFIC EMBODIMENTS

Figure 1:
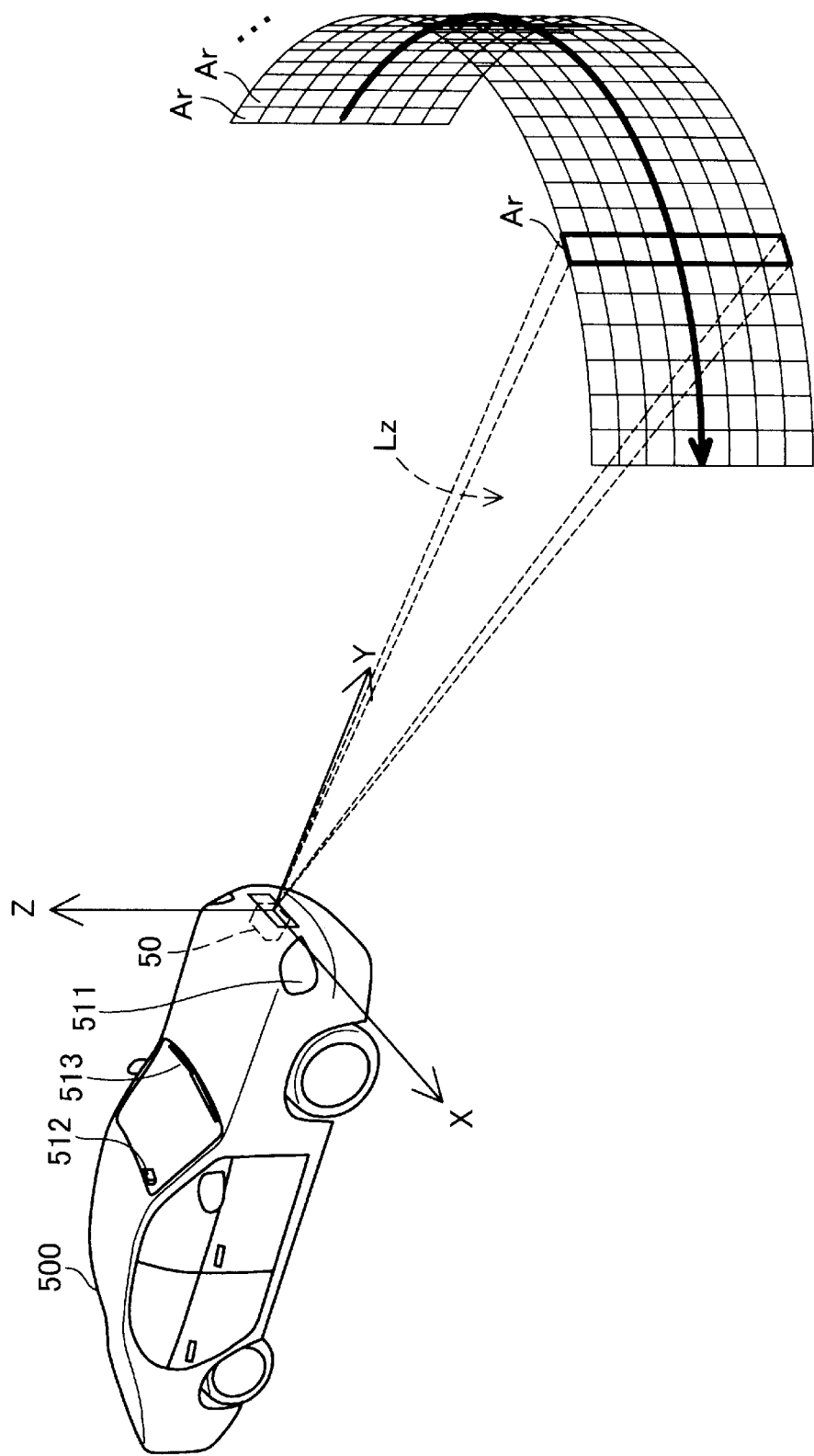
FIG. 1 is a schematic diagram of a vehicle equipped with an object detection device according to one embodiment of the present disclosure.

In the above known technique for detecting an object by combining information acquired from a plurality of sensors, as disclosed in JP-A-2007-310741, there is a risk of erroneous detection of objects, e.g., the presence or absence, size, position or the like of an object, due to misalignment of the installation position of each sensor, misalignment of detection timing, or the like. For example, a person behind a preceding vehicle ahead of the vehicle can be detected from the installation position of the imaging camera, but this person may not be detected from the installation position of the laser radar because the laser may fail to irradiate the person, and the calculated total existence probability may be estimated to be very small even though this person actually exists. In addition, for example, since the detectable regions of the respective sensors are different from each other, the accuracy of object detection becomes low for a region where the detectable regions of the respective sensors do not overlap. Such an issue is common not only to cases where the stereo cameras, the millimeter wave radar, and the laser radar mounted to the vehicle are used, but also to all cases where multiple types of information can be acquired from multiple types of sensors mounted to the vehicle.

In view of the foregoing, it is desired to have a technique that can suppress degradation of the detection accuracy when detecting an object using multiple types of information.

One aspect of the present disclosure provides an object detection device for detecting an object. In the object detection device, a single sensor unit including a light emitting unit configured to emit illumination light, and a light receiving unit including a two-dimensional array of a plurality of light receiving elements on a light receiving surface for receiving light including reflected light of the illumination light, the light receiving unit being configured to output a light reception signal in response to a light reception state of a set of the light receiving elements in each pixel, the set of the light receiving elements within each predefined pixel region forming one pixel, the sensor unit being configured to, based on the light reception signals, acquire first information indicating reception intensity of the reflected light at each pixel, second information indicating reception intensity of background light that is light other than the reflected light, at each pixel, and third information indicating a distance to the object at each pixel as a pixel value of the pixel. A detection unit is configured to use the pixel value of each pixel to detect the object, the detection unit being configured to use all of the first to third information included in the acquired pixel values of the respective pixels to detect the object.

According to the above object detection device, the first and third information used to detect an object are all acquired by the single sensor unit, such that the accuracy of object detection can be reduced as compared to a configuration in which at least some of these items of information is acquired by multiple different sensor units. Specifically, since the first to third information are acquired by the single sensor unit, the various parameters for acquiring the first to third information, such as the installation position of the sensor unit, an illuminated range with illumination light, and detection timings, can be matched. Therefore, erroneous detection of objects caused by misalignment of the installation position of the sensor unit or detection timings can be suppressed.

It should be appreciated that the present disclosure is not to be limited to the object detection device and that the present disclosure may be implemented in various ways, such as a vehicle including the object detection device, an object detection method, a computer program for enabling a computer to function as the object detection device and

A. First Embodiment

A1. Device Configuration

As illustrated in FIG. 1, an object detection device 50 according to a first embodiment is mounted to a vehicle 500 and measures a distance to an object, such as another vehicle, a pedestrian, a building, or the like, located around and ahead of the vehicle 500. The object detection device 50 emits illumination light Lz and receives its reflected light from the object. In FIG. 1, the emission center position of the illumination light Lz is represented as the origin, the forward direction of the vehicle 500 as the Y-axis, the direction from left to right along the lateral direction of the vehicle 500 passing through the origin as the X-axis, and the vertical upward direction passing through the origin as the Z-axis. As illustrated in FIG. 1, the illumination light Lz is elongated beam of light in the Z-axis direction and illuminates a predefined vertical area Ar in a single emission. The illumination light Lz illuminates the entire predefined measurement region by one-dimensional scanning in the direction parallel to the X-Y plane. The object detection device 50 receives, in addition to the reflected light of the illumination light Lz from the object, background light that means light other light reflected, such as sunlight, light from street lamps, or light from headlights of other vehicles. The object detection device 50 determines the intensity of background light using information related to the intensity of received light and sets a determination threshold based on such intensity. The object detection device 50 then determines, among the received light, the light having the intensity equal to or higher than the determination threshold as the reflected light from the object, and determines a time from emission of the illumination light Lz to reception of the reflected light, that is, a TOF (Time of Flight) of the light. Then, the object detection device 50 calculates the distance to the object assuming that such flight time TOF is a time for the light to make a round trip between the vehicle 500 and the object.

Figure 2:
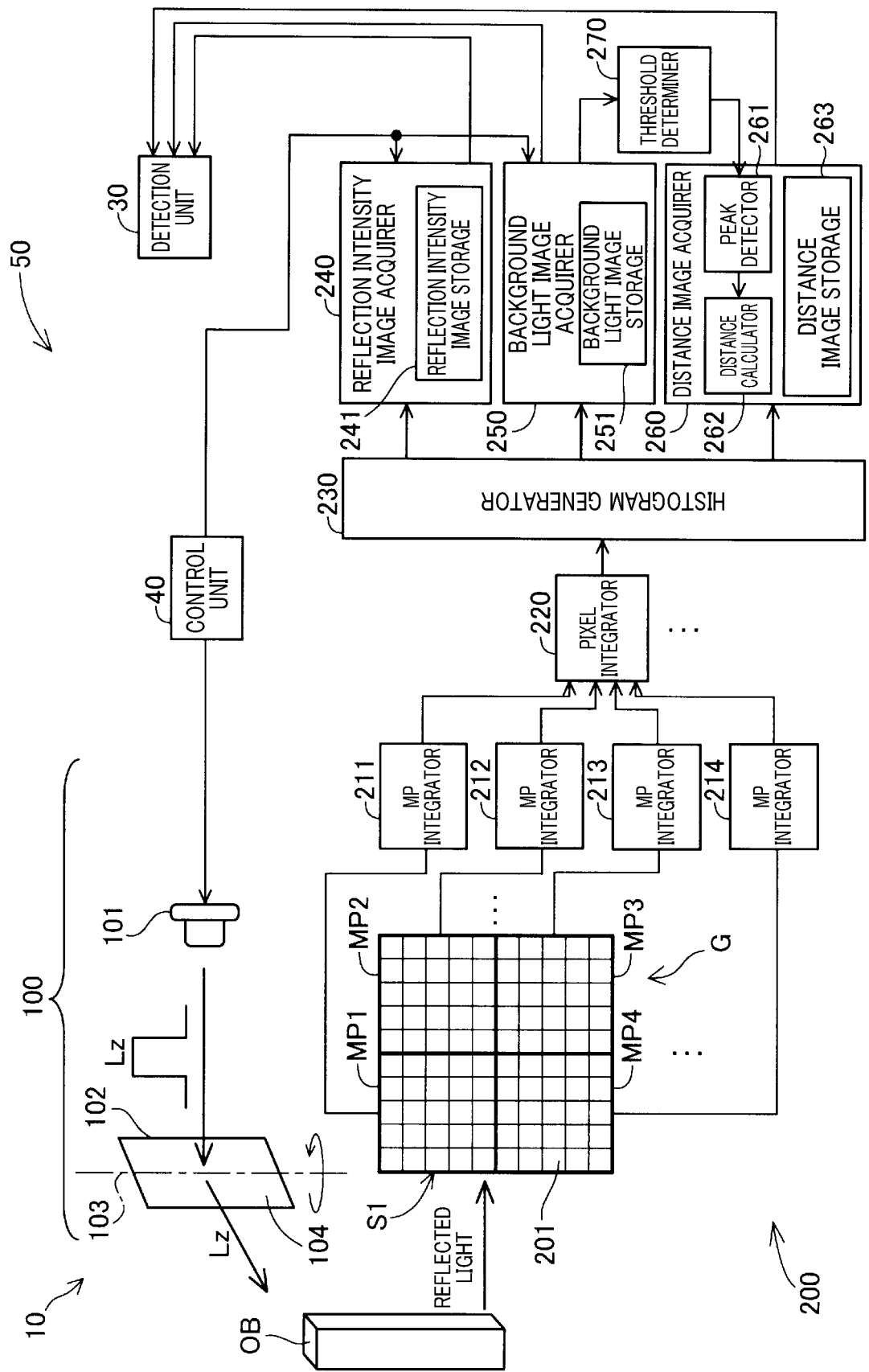
FIG. 2 is a functional block diagram of the object detection device.

As illustrated in FIG. 2, the object detection device 50 includes a sensor device 10, a detection unit 30, and a control unit 40. The sensor device 10 emits the illumination light Lz, acquires a reflection intensity image in which the intensity of the reflected light of the illumination light Lz is a pixel value of each pixel, a distance image in which the distance to the object is a pixel value of each pixel, and a background light image in which the intensity of the background light is a pixel value of each pixel, and uses the pixel value of each pixel of each of these three images to detect the object.

The sensor device 10 includes a light emitting unit 100 and a light receiving unit 200. The light emitting unit 100 includes a laser source 101 and a scanner 102. The laser source 101 is formed of a semiconductor laser diode and emits a pulsed laser beam as the illumination light Lz every predefined period under control of the control unit 40. For example, the predefined period is previously acquired by experiment and set as a period of time that is equal to or longer than a period of time required for reflected light from an object within a predefined region to be received by the sensor device 10 after emission of the illumination light Lz. The illumination light Lz emitted from the laser source 101 is formed as vertically elongated illumination light Lz as illustrated in FIG. 1 by an optical system (not shown). The scanner 102 performs one-dimensional scanning with the illumination light Lz over a predefined measurement region by rotating the mirror 104 around the rotation axis 103. The mirror 104 is formed of, for example, a MEMS mirror. The rotation of the mirror 104 is controlled by the control unit 40. One-dimensional scanning with the illumination light Lz is performed by the scanner 102, such that the light emitting unit 100 emits the illumination light Lz while changing the direction of the illumination light Lz toward the measurement region ahead of the vehicle 500. Any other type of laser source, such as a solid-state laser, may be used as the laser source 101 instead of the laser diode element. The illumination light Lz may be horizontally elongated illumination light and scanning may be two-dimensional scanning.

The illumination light Lz emitted from the light emitting unit 100 is reflected by the object OB within the measurement region. The reflected light reflected by the object OB is received by the light receiving unit 200. In the present embodiment, the light receiving unit 200 receives the reflected light via an optical system (not shown) configured such that the size of the reflected light at the light receiving surface S1 is smaller than the size of the light receiving surface S1. The reflected light may be received by the light receiving unit 200 such that a portion thereof (e.g., a longitudinal end portion) protrudes from the light receiving surface S1.

The light receiving unit 200 includes a two-dimensional array of a plurality of pixels G on the light receiving surface S1, a plurality of MP integrators 211, 212, 213, 214, ..., a pixel integrator 220, a histogram generator 230, a reflection intensity image acquirer 240, a background light image acquirer 250, a distance image acquirer 260, and a threshold determiner 270.

The light receiving unit 200 includes a two-dimensional array of a plurality of pixels G on the light receiving surface S1. In FIG. 2, only one pixel G is depicted for illustration purposes. In the example of FIG. 2, each pixel G includes a total of four macro pixels MP1 to MP4 as a two-by-two array of macro pixels. Each macro pixel MP1, ..., MP4 includes a total of 25 light receiving elements 31 as a five-by-five array of light receiving elements. Therefore, in the example of FIG. 2, each pixel G includes a total of 100 light receiving elements 31 as a ten-by-ten array of light receiving elements. In the present embodiment, each light receiving element 31 includes a single photon avalanche diode (SPAD). Upon reception of light (a photon), the SPAD outputs, with a certain probability, a pulse-shaped output signal (hereinafter also referred to as a light reception signal) indicating incidence of light. Therefore, in the example of FIG. 2, each macro pixel MP1, ..., MP4 outputs 0 to 25 light reception signals according to the intensity of the received light. In addition, the pixel G as a whole outputs 0 to 100 light reception signals according to the intensity of the received light.

Among the plurality of MP integrators, only the four MP integrators 211-214 connected to one pixel G are depicted in FIG. 1. The MP integrator 211 is connected to each of the light receiving elements 31 forming the macro pixel MP1 and counts the number of light reception signals output from the light receiving elements 31 within the macro pixel MP1. Similarly, each of the other MP integrators 212 to 214 are connected to each of the light receiving elements 31 forming the corresponding macro pixel and counts the number of light reception signals output from the light receiving elements 31 within the corresponding macro pixel (hereinafter also referred to as the number of light receptions). Similarly, each of the other pixels G that are not shown in FIG. 2 is connected to four MP integrators corresponding to four macro pixels.

The pixel integrator 220 counts the number of light receptions for one pixel G, i.e., the number of light reception signals output from the light receiving elements 31 included in one pixel. Specifically, the pixel integrator 220 is connected to four MP integrators 211 to 214 and receives a count result from each of the MP integrators 211 to 214, that is, the number of light reception signals in each of the macro pixels MP1 to MP4, and adds them up. Although the pixel integrator 220 is provided for each pixel G, only the pixel integrator 220 corresponding to one pixel G is illustrated in FIG. 2.

The histogram generator 230 generates and stores a histogram in which the total number of light receptions at each pixel acquired by the pixel integrator 220 is recorded for each predefined unit time.

The reflection intensity image acquirer 240 acquires a reflection intensity image. The reflection intensity image means an image in which the intensity (hereinafter referred to as "reflection intensity") of light received at each pixel from a region illuminated with the illumination light Lz, i.e., the predefined region Ar illustrated in FIG. 1, is a pixel value. The reflection intensity image acquirer 240 acquires the number of light receptions corresponding to the reflection intensity at each pixel from the histogram generated by the histogram generator 230, as the pixel value of the pixel. The reflection intensity image acquirer 240 acquires, from the control unit 40, information indicating to which predefined region Ar the illumination light Lz was emitted, and determines the reflection intensity (the number of light receptions) to be acquired from the histogram based on such information. Thus, the reflection intensity image is acquired every cycle that the light emitting unit 100 performs one scan. The cycle in which the above-described scan is performed is also referred to as a frame period, and the acquired image is also referred to as a frame image of the reflection intensity. The reflection intensity image acquirer 240 includes a reflection intensity image storage 241, and the acquired reflection intensity image (frame image) is stored in the reflection intensity image storage 241. The "reflection intensity" means, in the present embodiment, the number of light receptions at the peak of the histogram. The reflection intensity image corresponds to first information in the present disclosure.

The background light image acquirer 250 acquires a background light image. The background light image means an image showing the received light intensity of the background light at each pixel G. The background light image acquirer 250 acquires the number of light receptions corresponding to the background light at each pixel from the histogram generated by the histogram generator 230, as a pixel value of the pixel. The background light image acquirer 250 acquires, from the control unit 40, information indicating in which direction the illumination light Lz was emitted to the predefined region Ar, and based on such information, determines the number of light receptions at each of the pixels other than the pixels corresponding to the direction in which the light would be reflected from the object OB as the number of light receptions corresponding to the background light. The background light image is also generated for each frame period described above. Therefore, the number of light receptions, which is the pixel value of each pixel in the background light image, corresponds to the total number of light receptions during the frame period in which the pixel is not illuminated with reflected light of the illumination light Lz from the object OB. That is, such a number of light receptions is the number of light receptions when the pixel is illuminated with only disturbance light, such as sunlight or street light, reflected from the object OB. The acquired background light image is also referred to as a frame image of the background light. The background light image acquirer 250 includes a background light image storage 251, and stores the acquired background light image (frame image) in the background light image storage 251. The background light image corresponds to second information in the present disclosure.

The distance image acquirer 260 acquires a distance image. The distance image means an image showing a distance to an object in a direction corresponding to each pixel G. The distance image acquirer 260 includes a peak detector 261, a distance calculator 262, and a distance image storage 263. The peak detector 261 detects a peak within a frame period at each pixel from the histogram generated by the histogram generation unit 230. Specifically, using a determination threshold determined by the threshold determiner 270, the peak detector 261 determines the presence or absence of a time at which the determination threshold is exceeded in each frame period at each pixel, and determines that there is a peak when there is such a time. Details of the determination threshold will be described later. The distance calculator 262 determines a time difference between the start of the frame period and the time of the peak detected by the peak detector 261 as a time of flight TOF of the light, and calculates the distance to the object OB, assuming that the time of flight TOF is a time for the light to make a round trip between the vehicle 500 and the object OB. Then, the distance image is acquired using the calculated distance to the object OB for each pixel as the pixel value, and stored in the distance image storage 263. The distance image is acquired for each frame period and is also referred to as a frame image of the distance. The distance image corresponds to third information in the present disclosure.

The threshold determiner 270 reads out the background light image acquired by the background light image acquirer 250 from the background light image storage 251, and determines the determination threshold based on the background light image. Specifically, in determining the determination threshold for acquiring the distance image in the current frame period, the average of the pixel values of the background light image in the previous (or preceding) frame period, that is, the average of the numbers of light receptions at the respective pixels of the previous background light frame image, is acquired. The determination threshold for the current frame period is determined by increasing the average by a predetermined number of light receptions. The predetermined number of light receptions is set by acquiring an appropriate value in advance through experiments or the like. The determination threshold is not limited to the average of the numbers of light receptions by each pixel in the previous frame image of the background light, but may be determined based on the number of light receptions by each pixel in any number of frame images before the previous frame image or the average thereof.

The detection unit 30 detects an object (object OB) using respective pixel values of each of the reflection intensity image, the background light image, and the distance image. Details of the object detection method performed by the detection unit 30 will be described later.

In the object detection device 50 configured as above performs an object detection process described later to detect an object (object OB) using three different types of information: the reflection intensity image; the background light image; and the distance image.

A2. Object Detection Process

In the object detection device 50, the object detection process is performed when ignition of the vehicle 500 is turned on. In the vehicle 500, the object detection process may be initiated upon reception of the initiation instruction from a user operating an interface via which user's instructions for initiating and terminating the ranging process are received, such as a physical button provided on an instrument panel or a menu screen displayed on a monitor. The steps S105 to S130 described later, which are included in the object detection process, are repeatedly performed every frame period.

Figure 3:
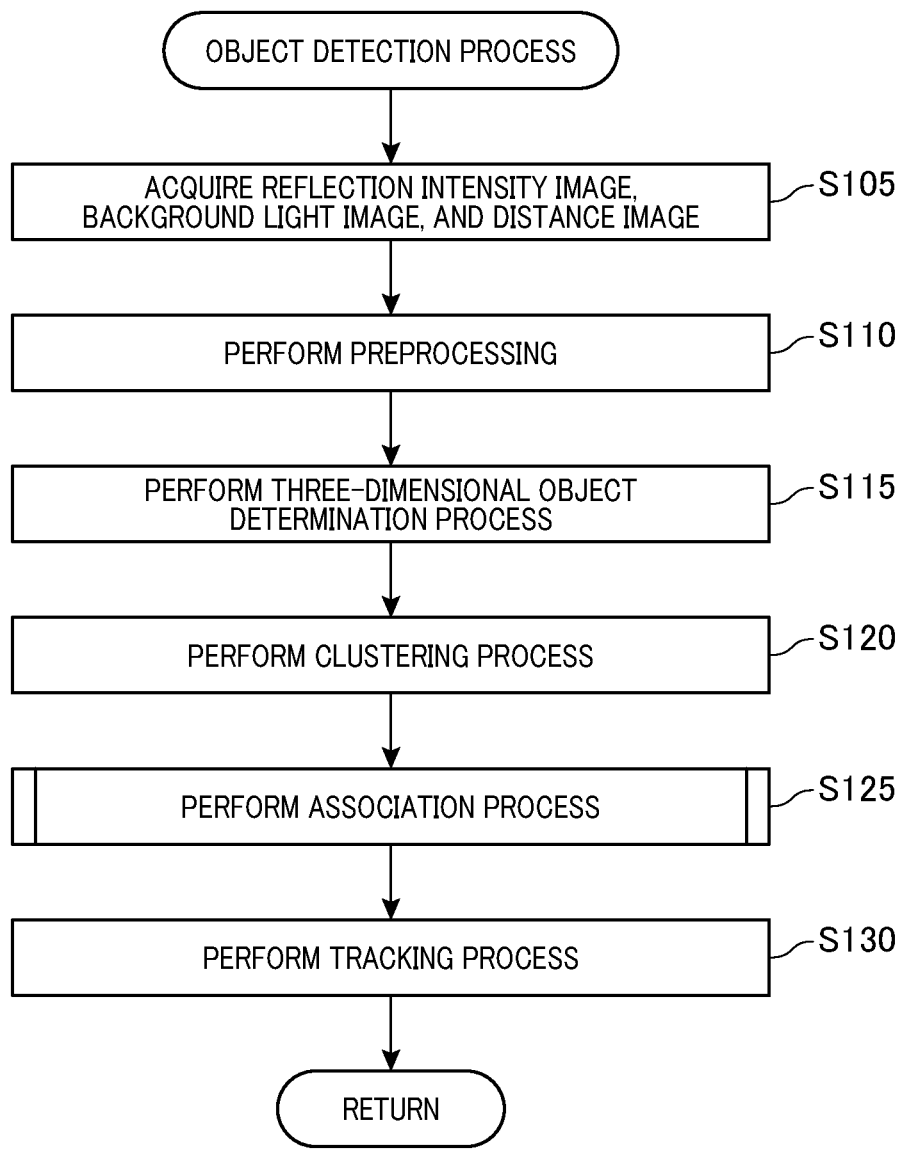
FIG. 3 is a flowchart of an object detection process of a first embodiment.

As illustrated in FIG. 3, at step S105, the detection unit 30 acquires the reflection intensity image, the background light image, and the distance image from the reflection intensity image acquirer 240, the background light image acquirer 250, and the distance image acquirer 260, respectively. At step S110, the detection unit 30 performs preprocessing. In the present embodiment, the preprocessing means, for each image acquired at step S105, a coordinate transformation process to transform polar coordinates into Cartesian coordinates, a process to determine valid range points acquired from objects within a predefined distance based on the three types of images, and a process to remove noise including raindrops. Any process for improving the accuracy of object recognition may be performed as preprocessing.

Figure 5:
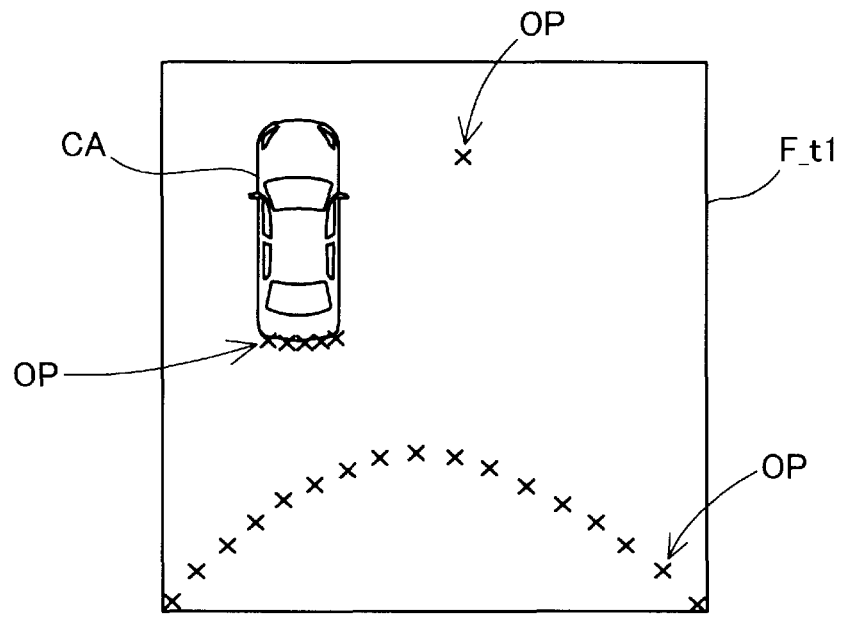
FIG. 5 is an illustration of an image representing range points acquired by LIDAR.

The image F_t1 at time t1 illustrated in FIG. 5 represents an image in which the range points OP acquired by step S110 are mapped onto the Cartesian coordinates. For the sake of understanding, FIG. 5 represents a vehicle CA traveling ahead of the vehicle 500. After step S110, a plurality of range points OP are represented on the Cartesian coordinates as the road on which the vehicle is traveling is viewed vertically top-down. The range points OP are pixels whose reflection intensity is equal to or higher than a predefined intensity. The respective range points OP are arranged based on the information of the distance image, taking into account the distance from the vehicle 500. As illustrated in FIG. 5, the range points OP arising from reflected light from the road, the range points OP arising from reflected light from the rearmost surface of the vehicle CA, and the range point OP on the road diagonally forward of the vehicle CA are acquired. The range point OP on the road diagonally forward of the vehicle CA corresponds to, for example, a range point OP arising from reflected light from a manhole.

Figure 6:
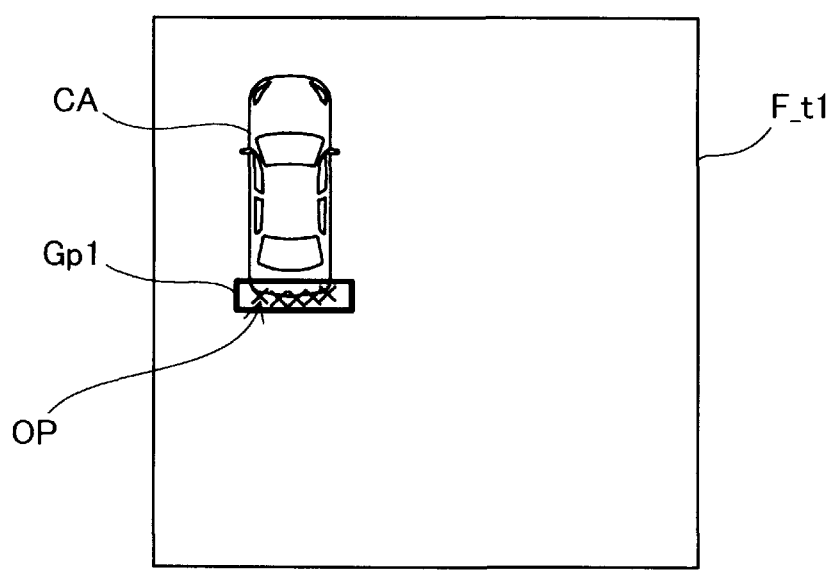
FIG. 6 is an illustration of an image representing a result of clustering.

As illustrated in FIG. 3, at step S115, the detection unit 30 performs a three-dimensional object determination process. Specifically, the detection unit 30 determines, among the range points OP, a range point OP whose height from the road surface on which the vehicle 500 is traveling is equal to or greater than a predefined dimension as a range point OP representing a three-dimensional object. That is, at step S115, a process of determining the position of the road surface on which the vehicle 500 is traveling is performed. Then, at step S120, the detection unit 30 performs clustering to associate the acquired range points OP that are estimated to represent the same object. In the present embodiment, the range points OP such that the distance between them is equal to or less than a predefined size are grouped together as a result of clustering. In the example illustrated in FIG. 6, the plurality of range points OP acquired from the rearmost surface of the vehicle CA in the image F_t1 illustrated in FIG. 5 are grouped together as a result of clustering Gp1.

As illustrated in FIG. 3, at step S125, the detection unit 30 performs an association process to associate a result of tracking (i.e., targets) acquired at step S130 described later performed in the previous frame period with the result of clustering acquired at step S120 performed in the current frame period.

Figure 4:
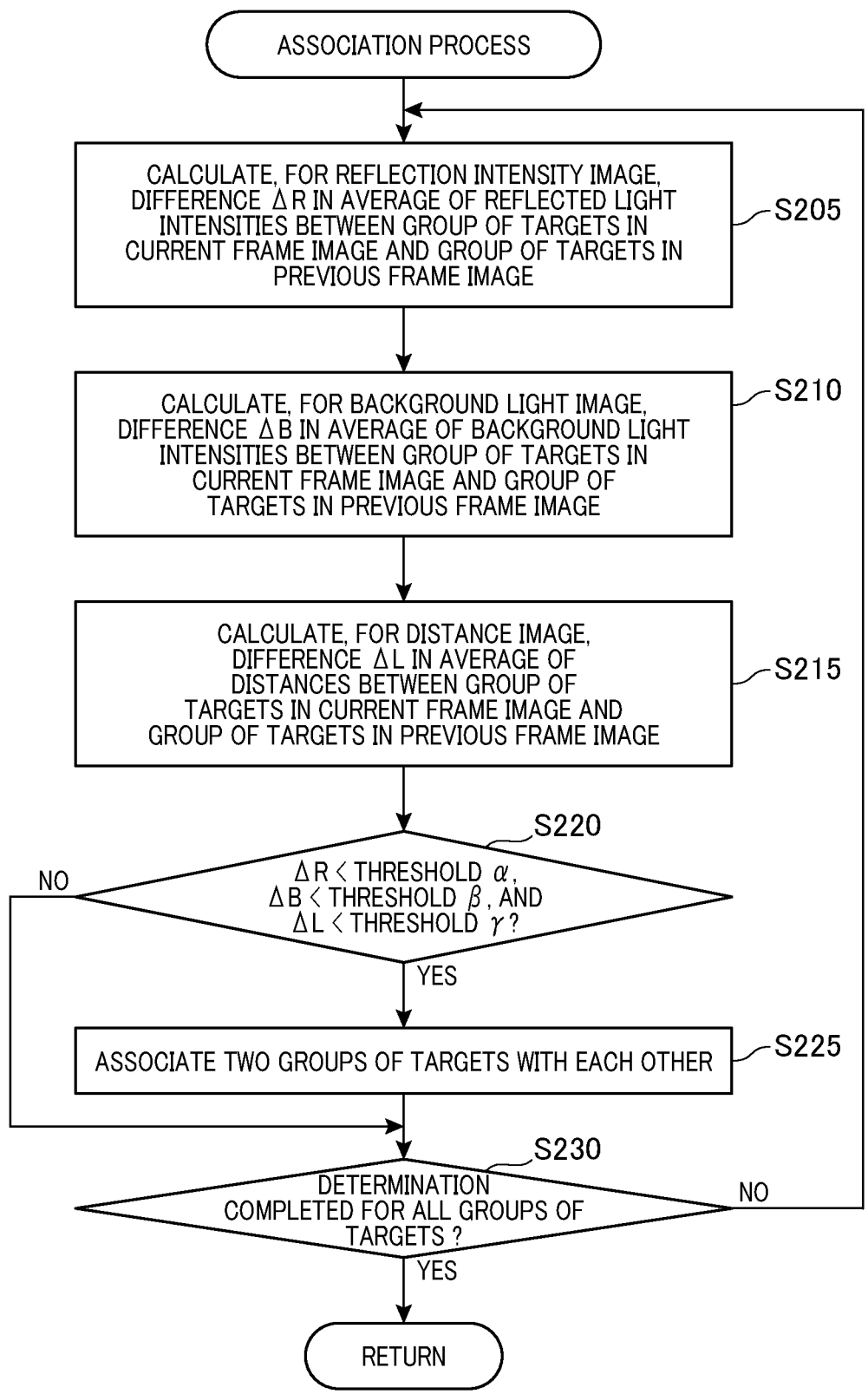
FIG. 4 is a flowchart of an association process.

As illustrated in FIG. 4, in the association process at step S205, the detection unit 30 calculates, for the reflection intensity images, a difference $\Delta R$ in average of reflected light intensities between the result of clustering performed on the current frame image and the result of tracking performed on the previous frame image. Specifically, the average of pixel values (reflection intensities) of pixels at positions for the group of targets as the result of clustering performed on the current frame image and the average of pixel values (reflection intensities) of pixels at positions for the group of targets as the result of tracking performed on the previous frame image are calculated, and the difference $\Delta R$ between these averages is acquired. In cases where multiple results of clustering are acquired for each frame image, the difference $\Delta R$ is calculated for each of the results of clustering at less than a certain distance from the center of gravity of the result of tracking.

At step S210, the detection unit 30 calculates, for the background light images, a difference $\Delta B$ in average of background light intensities between the result of clustering performed on the current frame image and the result of tracking performed on the previous frame image. At step S215, as at step S205, the detection unit 30 calculates, for the distance images, a difference $\Delta L$ in average of distances between the result of clustering performed on the current frame image and the result of tracking performed on the previous frame image.

At step S220, the detection unit 30 determines whether the difference $\Delta R$ acquired at step S205 is less than a predefined threshold $\alpha$, whether the difference $\Delta B$ acquired at step S210 is less than a predefined threshold $\beta$, and whether the difference $\Delta L$ acquired at step S215 is less than a predefined threshold $\gamma$. Each of the thresholds $\alpha$, $\beta$, and $\gamma$ is set by experiments in advance as a maximum value of the difference assumed when the result of clustering performed on the current frame image and the result of tracking performed on the previous frame image correspond to the same object.

If it is determined that the difference $\Delta R$ is less than the threshold $\alpha$, the difference $\Delta B$ is less than the threshold $\beta$, and the difference $\Delta L$ is less than the threshold $\gamma$, that is the answer is YES at step S220, then at step S225 the detection unit 30 associates the result of clustering for the current frame image and the result of tracking for the previous frame image with each other. At step S230, the detection unit 30 determines whether the determination has been completed for all of the results of clustering included in the current frame image, and if determining that the determination has not been completed for all of the results of clustering, that is, if the answer is NO at step S230, the detection unit 30 returns to step S205 to perform the above-described steps S205 to S230 for another result of clustering. If it is determined that the determination has been completed for all of the results of clustering, that is, if the answer is YES at step S230, the association process is terminated and then step S130 illustrated in FIG. 3 is performed.

If at step S220 it is determined that the difference $\Delta R$ is not less than the threshold $\alpha$, or the difference $\Delta B$ is not less than the threshold $\beta$, or the difference $\Delta L$ is not less than the threshold $\gamma$, that is, if the answer is NO at step S220, then step S230 is performed. Therefore, in such cases, step S225 is not performed, and the result of tracking and the result of clustering will not be associated with each other. Thus, in the association process of the present embodiment, the result of tracking and the result of clustering are associated with each other in response to the difference ΔR in reflected light intensity, the difference ΔB in background light intensity, and the difference ΔL in distance being all less than their respective thresholds. Therefore, the accuracy of association can be improved compared to a configuration in which the result of tracking and the result of clustering are associated in response to two or less of the three differences ΔR, ΔB, and ΔL being less than their respective thresholds. In the above configuration, the association between the result of tracking and the result of clustering is performed in response to the answer at step S220 being YES, but the present embodiment is not limited thereto. In cases where two or less of the three differences ΔR, ΔB, and ΔL are less than their respective thresholds, the association between the result of tracking and the result of clustering may be performed for the smallest one of the differences ΔR, ΔB, and ΔL.

As illustrated in FIG. 3, at step S130 after completion of step S125, the detection unit 30 performs a tracking process to acquire a trajectory of the object based on the result of the clustering performed on the current frame image, associated with the result of tracking performed on the previous frame image at step S125, and the result of tracking performed on the previous frame image. In the present embodiment, the above filtering means a Kalman filter, but not limited thereto. An extended Kalman filter or a particle filter may be used. In this way, the result acquired by the tracking process at step S130 is the result of tracking for the current frame image.

Figure 7:
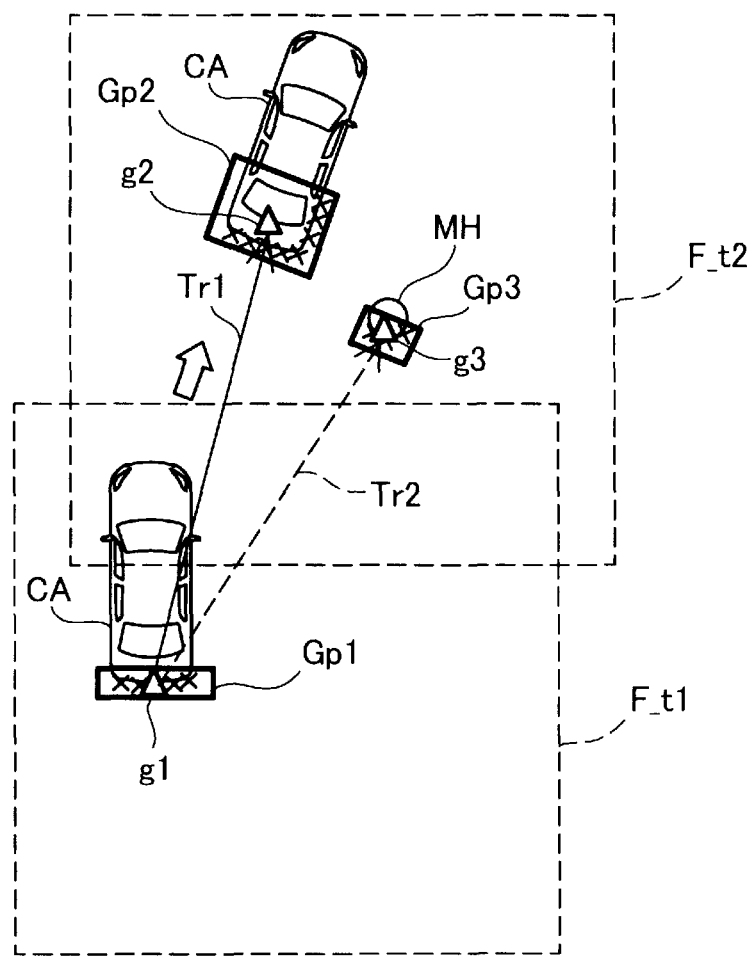
FIG. 7 is an illustration of an example result of the association process.

As illustrated in FIG. 7, for example, in the current frame image F_t2, a plurality of range points OP acquired from the rearmost part of the preceding vehicle are determined as the result of clustering Gp2, and such result of clustering Gp2 is associated with the result of tracking Gp1 in the previous frame image F_t1. In this case, the detection unit 30 acquires the center-of-gravity position g1 of the result of tracking Gp1 and the center-of-gravity position g2 of the result of clustering Gp2, and acquires a straight line connecting these two positions g1 and g2 as the trajectory Tr1 of the object (i.e., the vehicle CA).

In the example of FIG. 7, in the frame image F_t2, there is a manhole MH in the vicinity of the vehicle CA, and a plurality of range points OP acquired from this manhole MH are determined as the result of clustering Gp3. As a comparative example, if the association process is performed on the basis of distances alone, for example, if the result of tracking in the previous frame image is associated with the result of clustering in the current frame whose center of gravity is closest to the center of gravity of the result of tracking in the previous frame image, the result of tracking Gp1 and the result of clustering Gp3 will be associated with each other. This is because the center of gravity of the result of clustering Gp3 is closer to the center of gravity of the result of tracking Gp1 than the center of gravity of the result of clustering Gp2. As a result, the trajectory Tr2 connecting the center-of-gravity position g1 of the result of tracking Gp1 and the center-of-gravity position g3 of the result of clustering Gp3 is incorrectly determined. In contrast, in the present embodiment, as described above, the result of tracking Gp1 indicating the vehicle CA in the frame image F_t1 is associated with the result of clustering Gp2 indicating the vehicle CA in the frame image F_t2. Therefore, the correct trajectory Tr1 is determined.

After completion of step S130, the process flow returns to step S105, and steps S105 to S130 are performed for the subsequent frame image.

According to the object detection device 50 of the first embodiment described above, the reflection intensity image, the background light image, and the distance image used for detecting objects are all acquired by the single sensor unit 10. Therefore, degradation of the detection accuracy can be suppressed as compared to the configuration in which at least some of these images are acquired by a plurality of different sensor devices. Specifically, since the three types of images described above are acquired by the single sensor device 10, various parameters for acquiring these images, such as the installation position of the sensor device 10, the illuminated region illuminated with the illumination light Lz, and the detection timing, can be matched. Erroneous detection of objects due to misalignment of the installation position of the sensor device 10 or misalignment of the detection timing can be inhibited.

According to the object detection device 50, the detection unit 30 performs the clustering process and the association process using the reflection intensity image, the background light image, and the distance image, such that these processes can be performed with high accuracy.

According to the object detection device 50, in the association process, for each of the reflection intensity image, the background light image, and the distance image, the average of the pixel values for the result of tracking in the previous frame image and the average of the pixel values for the result of clustering in the current frame image are acquired, and the differences ΔR, ΔB, and ΔL between these averages are acquired. When the differences ΔR, ΔB, and ΔL for the reflection intensity image, the background light image, and the distance image, respectively, are all less than their respective threshold values α, β, and γ, the result of tracking in the previous frame image and the result of clustering in the current frame image are associated with each other, such that association can be performed accurately between these two frame images. In addition, use of such three types of information allows different objects to easily be discriminated and allows the same objects to easily be identified as the same. Therefore, the association can be performed with high accuracy.

The light receiving element 201 includes at least one SPAD that outputs an output signal indicating incidence of light as a light reception signal, which allows the presence or absence of light reception at each pixel to be accurately determined.

B. Second Embodiment

B1. Device Configuration

Figure 8:
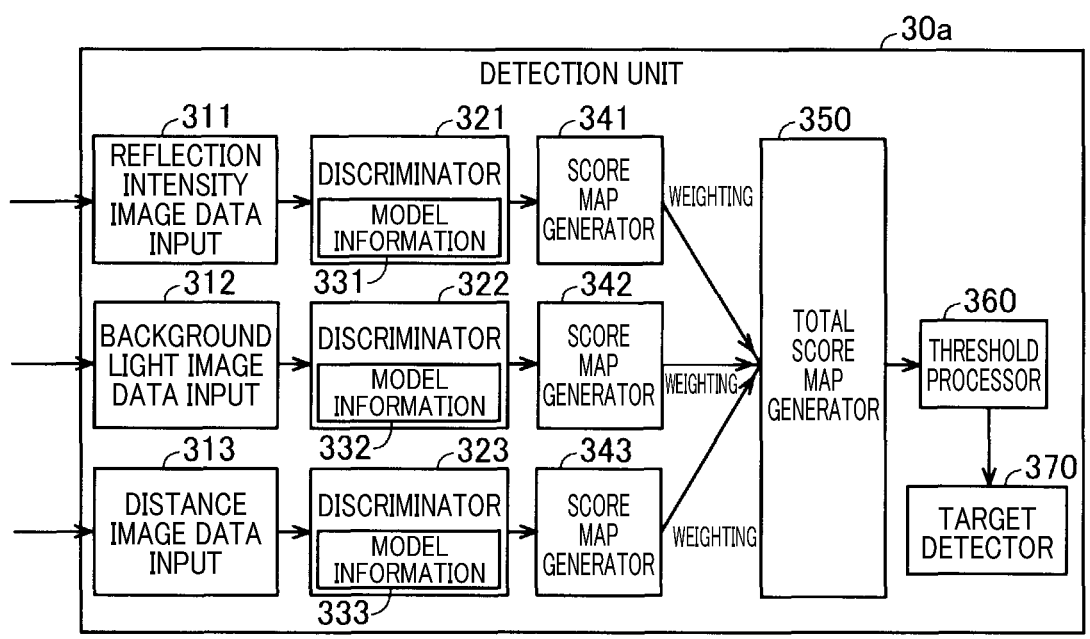
FIG. 8 is a functional block diagram of a detection unit of a second embodiment.

The object detection device 50 of the second embodiment differs from the object detection device 50 of the first embodiment in that the detection unit 30a illustrated in FIG. 8 is provided instead of the detection unit 30. The other configurations of the object detection device 50 of the second embodiment are the same as those of the object detection device 50 of the first embodiment. Therefore, the same reference numerals are assigned to the same components and detailed description thereof is omitted.

As illustrated in FIG. 8, the detection unit 30a of the second embodiment includes a reflection intensity image data input 311, a background light image data input 312, a distance image data input 313, three discriminators 321, 322, 323, three score map generators 341, 342, 343, a total score map generator 350, a threshold processor 360, and a target detector 370.

The reflection intensity image data input 311 receives data of the reflection intensity image from the reflection intensity image acquirer 240. The background light image data input 312 receives data of the background light image from the background light image acquirer 250. The distance image data input 313 receives data of the distance image from the distance image acquirer 260.

The discriminator 321 is preset with model information 331. This model information 331 is information indicating predefined reflection intensity models (patterns) for objects. The discriminator 321 raster-scans the reflection intensity image received from the reflection intensity image data input 311, contrasts the reflection intensity image with the model information 331, determines, for each pixel, a likelihood that an object is present (hereinafter referred to as a first likelihood), and generates a score map of the first likelihoods for the respective pixels (hereinafter referred to as a first score map).

The discriminator 322 is preset with model information 332. This model information 332 is information indicating predefined background light intensity models (patterns) for objects. The discriminator 322 raster-scans the background light image received from the background light image data input 312, contrasts the background light image with the model information 332, determines, for each pixel, a likelihood that an object is present (hereinafter referred to as a second likelihood), and generates a score map of the second likelihoods for the respective pixels (hereinafter referred to as a second score map).

The discriminator 323 is preset with model information 333. This model information 333 is information indicating predefined distance models (patterns) for objects. The discriminator 323 raster-scans the distance image received from the distance image data input 313, contrasts the distance image with the model information 333, determines, for each pixel, a likelihood that an object is present (hereinafter referred to as a third likelihood), and generates a score map of the third likelihoods for the respective pixels (hereinafter referred to as a third score map).

The total score map generator 350 weights each of the first score map Scr(1) generated by the score map generator 341, the second score map Scr(2) generated by the score map generator 342, and the third score map Scr(3) generated by the score map generator 343 (with a weighting factor w(i) (i=1, 2, 3)) and adds them together according to the following equation (1) to generate an total score map Scr(Total). In the present embodiment, the weighting factors are set by a weight setting process described later. The initial value of each weighting factor is set to a value such that the first score map:the second score map:the third score map is 1:1:1. Details of weighting will be described later. In addition to generating the total score map, the total score map generator 350 acquires intensity-related information related to the background light intensity. Details of the intensity-related information will be described later. In the second embodiment, the total score map generator 350 corresponds to a second information acquirer in the present disclosure.

$$Scr(\text{Total}) = \sum_{i=1}^{3} \{w(i) \times Scr(i)\} \quad (1)$$

The threshold processor 360 applies a predefined score threshold to the total score map generated by the total score map generating unit 350 to identify pixels whose overall score is equal to or greater than the score threshold. The target detector 370 detects the pixels whose overall score is equal to or greater than the score threshold as targets indicating an object.

B2. Object Detection Process

The object detection process of the second embodiment illustrated in FIG. 9 differs from the object detection process of the first embodiment in that step S115 is removed and steps S111, S112, S113, and S119 are added. The other process steps of the object detection process of the second embodiment are the same as those of the object detection process of the first embodiment. Therefore, the same reference numerals are assigned to the same process steps and detailed description thereof is omitted.

After completion of steps S105 and S110, the score map generator 341, at step S111, generates the first score map based on the reflection intensity image received from the reflection intensity image data input 311. The score map generator 342, at step S112, generates the second score map based on the background light image received from the background light image data input 312. The score map generator 343, at step S113, generates the third score map based on the distance image received from the distance image data input 313. In the present embodiment, these three steps S111 to S113 are performed in parallel processing, but may be performed in serial processing in a predefined order.

At step S118, the total score map generator 350 performs a weighting setting process. As illustrated in FIG. 10, in the weighting setting process, the total score map generator 350, at step S305, acquires intensity-related information of the background light. The intensity-related information of the background light means the information related to the background light intensity. In the present embodiment, the intensity-related information corresponds to the following information (i) to (iv): (i) information about the number of light receptions indicating the intensity of the background light image; (ii) information indicating a lighting state of lights 511 illustrated in FIG. 1 mounted to the vehicle 500; (iii) information indicating a result of detection by a solar radiation sensor 512 illustrated in FIG. 1 mounted to the vehicle 500; and (iv) information indicating an operating state of a wiper device 513 illustrated in FIG. 1 mounted to the vehicle 500.

The above information (i) is acquired from the background light image acquirer 250. In the background light image acquirer 250, the average number of light receptions of the background light image is acquired and information about such average number of light receptions is transmitted to the detection unit 30a as information indicating the intensity of the background light image. The above information (ii) means information indicating whether the light 511 is on or off, and is acquired from an electronic control unit (ECU) that controls the lights 511. The above information (iii) means an amount of solar radiation detected by the solar radiation sensor 512, and is acquired from an ECU that controls the solar radiation sensor 512. The above information (iv) means information indicating whether the wiper device 513 is operating, and is acquired from an ECU that controls the wiper device 513.

As illustrated in FIG. 10, at step S310, the total score map generator 350 determines a brightness environment of the measurement region based on the intensity-related information acquired at step S305. In the present embodiment, the brightness environment means either an environment that is bright (hereinafter referred to as a bright environment) or an environment that is darker than the bright environment (hereinafter referred to as a dark environment). The total score map generating unit 350 determines that the environment is a bright environment when the average number of light receptions of the background light is equal to or greater than a threshold, and that the environment is a dark environment when the average number of light receptions of the background light image is less than the threshold. At step S310, it is determined that the environment is a bright environment when the above information (i) indicates that the average number of light receptions of the background light image is equal to or greater than the threshold, the above information (ii) indicates that the lights 511 are off, the above information (iii) indicates that the result of detection by the solar radiation sensor 12 is equal to or greater than a predefined solar radiation threshold, and the above information (iv) indicates that the wiper device 513 is off. In other cases, it is determined that the environment is a dark environment. Generally, the environment is determined as a bright environment when the vehicle 500 is traveling in a place different from the shade of a building or in a tunnel, during the daytime on a sunny day. The environment is determined as a dark environment when it is night-time or when the vehicle 500 is traveling in the shade of a building or in a tunnel.

At step S315, the total score map generator 350 determines whether the result of determination at step S310 is a bright environment. If the result of determination at step S310 is a bright environment, that is, if the answer is YES at step S315, then at step S320 the total score map generator 350 sets the weighting factors w(1) and w(3) of the first score map (for the reflected light intensity image) and the third score map (for the distance image) to be less than the initial value, and sets the weighting factor w(2) of the second score map (for the background light image) to be greater than the initial value. In such a case, both the values of w(1) and w(3) may be set to 0. As a result, the weighting factors of the first and third score maps are set to be less than the weighting factor of the second score map. That is, the result from the second information is prioritized over the results from the first and third information. After completion of the step S320, the weighting setting process ends and the step S119 of FIG. 9 is performed.

If the result of determination at step S310 is a dark environment, that is, if the answer is NO at step S315, then at step S325 the total score map generator 350 sets the weighting factors w(1) and w(3) of the first score map (for the reflected light intensity image) and the third score map (for the distance image) to be greater than the initial value, and sets the weighting factor w(2) of the second score map (for the background light image) to be less than the initial value. In such a case, the value of w(2) may be set to 0. As a result, the weighting factors of the first and third score maps are set to be greater than the weighting factor of the second score map. That is, the results from the first information and the third information are prioritized over the result from the second information. After completion of the step S325, the weighting setting process ends and the step S119 of FIG. 9 is performed.

In the bright environment, the intensity of the background light is high. Thus, the intensity ratio between the reflected light and the background light becomes small, that is, the S/N ratio deteriorates and the intensity of the reflected light from the object OB can not be accurately determined. Therefore, in the bright environment, the reliability of the first likelihood and the third likelihood is lower than that in the dark environment, and therefore, in present embodiment, the weighting factors of the first and third score maps are set to be relatively low. On the other hand, the reliability of the second likelihood is high as the background light intensity is high. For this reason, in present embodiment, the weighting factor of the second score map is set relatively high.

In the dark environment, the intensity of the background light is low. Thus, the intensity ratio between the reflected light and the background light becomes large, that is, the S/N ratio is good and the intensity of the reflected light from the object OB can be accurately determined, which allows the distance to the object OB to be accurately determined. Therefore, in the dark environment, the reliability of the first likelihood and the third likelihood is higher than in the dark environment, and therefore, in present embodiment, the weighting factors of the first and third score maps are set relatively high. On the other hand, the reliability of the second likelihood is low as the background light intensity is low. For this reason, in present embodiment, the weighting factor of the second score map is set relatively low.

As illustrated in FIG. 9, at step S119, the total score map generator 350 applies the weighting factors set at step S118 to the first to third score maps, that is, the results of detection of objects in the reflection intensity image, the background light image, and the distance image, to generate the total score map. As described above, threshold processing is performed on the generated total score map to identify the targets indicating the object. Then, the above-described steps S120 to S130 are performed using the targets identified in this manner.

The object detection device 50 of the second embodiment described above provides similar advantages to those provided by the object detection device 50 of the first embodiment. In addition, the three discriminators 321 to 323 contrast each input image (the reflection intensity image, the background light image, and the distance image) with the model information 331 to 333 to detect an object (generate the first or third score map), which enables parallel processing and high processing speed of the detection unit 30a. In addition, the total score map (total likelihood) is acquired by calculating a weighted sum of the first to third score maps (first to third likelihoods) acquired by contrasting each of the input images with the model information 331 to 333, and an object is detected using the acquired total score map. Therefore, the object detection accuracy can be improved as compared to a configuration in which the total score map is acquired by adding the likelihoods acquired from contrasting each of the input images with one or two of the model information 331 to 333.

When the background light intensity is high, i.e., in the bright environment, the reflected light intensity can not be acquired with high accuracy due to the higher noise compared to when the background light intensity is low, and distances can not be acquired with high accuracy. Thus, when the background light intensity is high, the first likelihood and the third likelihood become less reliable values as compared to when the background light intensity is low. This is because information with low accuracy is acquired as the reflected light intensity image and the distance image. When the background light intensity is high, the second likelihood becomes a highly reliable value as compared to when the background light intensity is low. This is because the background light intensity can be acquired with higher accuracy and information with high accuracy is acquired as the second information. Therefore, according to the object detection device 50 of the second embodiment, when the background light intensity is high, that is, in the bright environment, the weightings for the first likelihood and the third likelihood are set lower while the weighting for the second likelihood is set higher as compared to when the background light intensity is low, such that a highly accurate total score map (total likelihood) can be acquired and the object detection accuracy can be improved.

C. Third Embodiment

The configuration of the object detection device 50 of the third embodiment is the same as that of the object detection device 50 of the first embodiment. Therefore, the same reference numerals are assigned to the same components and detailed description thereof is omitted. The object detection process of the third embodiment differs from the object detection process of the first embodiment in that steps S106 and S107 are added, as illustrated in FIG. 11. The other process steps of the object detection process of the third embodiment are the same as those of the object detection process of the first embodiment. Therefore, the same reference numerals are assigned to the same process steps and detailed description thereof is omitted. In the third embodiment, the detection unit 30 corresponds to a detection unit and a contrast-related value calculator in the present disclosure.

After completion of step S105, the detection unit 30, at step S106, calculates a contrast-related value for each of the reflection intensity image, the background light image, and the distance image. The contrast-related value is a value related to contrast, and the higher the contrast, the larger the value is set. In the present embodiment, the contrast-related value means a value of Michelson contrast. The contrast-related value is not limited thereto, but may be any parameter related to contrast, such as the variance of pixel values or the ratio of the maximum pixel value to the minimum pixel value in each image.

At step S107, the detection unit 30 determines whether the contrast-related value calculated at step S106 for each image is equal to or greater than a predefined contrast threshold. Such contrast threshold is set as a threshold for removing images that are unsuitable for detecting an object, and is acquired in advance by experiments or the like. For example, in a situation where there is no street light at night, the contrast-related value is very small in a situation where there are no objects OB in the surroundings because there is little background light. On the contrary, in a backlit situation, the contrast-related value is very small even in a situation where there is an object OB in the surroundings due to very high intensity of the background light. In these situations, there is a risk of erroneous detection of objects OB. Therefore, the maximum of the contrast-related value that is likely to cause such erroneous detection is experimentally acquired, and a value greater than the maximum of the contrast-related value is set as the contrast threshold.

If it is determined that, for each image, the contrast value is equal to or greater than the contrast threshold, that is, if the answer is YES at step S107, the detection unit 30 performs the above-described steps S110 to S130. On the other hand, if it is determined that at least one of the contrast values calculated for all the respective images is less than the contrast threshold, that is, if the answer is NO at step S107, steps S110 to S130 are skipped, the process flow returns to step S105, and steps S105 to S130 are performed again in the next frame period.

The object detection device 50 of the third embodiment described above provides similar advantages to those provided by the object detection device 50 of the first embodiment. In addition, when the contrast-related value calculated for at least one of the reflection intensity image, the background light image, and the distance image is less than the contrast threshold, the object is not detected using the acquired three types of images. Therefore, it is possible to inhibit use of images for object detection, in which the boundary between the object and the background is difficult to recognize due to the contrast-related value being less than the contrast threshold, thereby suppressing degradation of the object detection accuracy.

D. Fourth Embodiment

The configuration of the object detection device 50 of the fourth embodiment is the same as that of the object detection device 50 of the first embodiment. Therefore, the same reference numerals are assigned to the same components and detailed description thereof is omitted. In the object detection device 50 of the fourth embodiment, the three threshold values $\alpha$, $\beta$, and $\gamma$ used in the association process illustrated in FIG. 4 are not fixed and preset values, but are variably set by the threshold setting process. Each of the three threshold values $\alpha$, $\beta$, and $\gamma$ is set to the initial value in advance. In the fourth embodiment, the detection unit 30 corresponds to a first information acquirer and a threshold setter in the present disclosure.

The threshold setting process of the fourth embodiment illustrated in FIG. 12 is performed between step S215 and step S220 illustrated in FIG. 4. The timing at which the threshold setting process is performed may be any timing before the step S220 is performed. Alternatively, the threshold setting process may be performed before the association process or in parallel with the association process as a different process from the association process illustrated in FIG. 4.

As illustrated in FIG. 12, at step S405, the detection unit 30 acquires the intensity-related information of the background light. The detection unit 30, at step S410, determines the brightness environment of the measurement region based on the intensity-related information acquired at step S405. The detection unit 30, at step S415, determines whether the result of determination at step S410 is the bright environment. Since the above-described steps S405 to S415 are the same as steps S305 to S315 of the weighting setting process of the second embodiment, details of steps S405 to S415 are omitted.

If it is determined that the result of determination at step S410 is the bright environment, that is, if the answer is YES at step S415, then at step S420 the threshold $\alpha$ (for the reflected light intensity image) and the threshold $\gamma$ (for the distance image) are both set greater than the initial value, and the threshold $\beta$ (for the background light image) is set less than the initial value. If it is determined that the result of determination at step S410 is not the bright environment, that is, the answer is NO at step S415, then at step S425 the threshold $\alpha$ (for the reflected light intensity image) and the threshold $\gamma$ (for the distance image) are both set less than the initial value, and the threshold $\beta$ (for the background light image) is set greater than the initial value. After completion of step S420 or S425, the process flow returns to the predefined process step of the association process, or in a configuration where the threshold setting process is performed in parallel with the association process, the threshold setting process ends.

As described above, in the bright environment, the intensity of the background light is high. Thus, the intensity ratio between the reflected light and the background light becomes small, that is, the S/N ratio deteriorates and the intensity of the reflected light from the object OB can not be accurately determined. Accordingly, in the bright environment, the differences $\Delta R$ and $\Delta L$ are likely to be calculated as relatively inaccurate values. In this case, the threshold values α and γ are set to large values. On the other hand, since the background light intensity is high, the background light intensity can be determined accurately, and the difference ΔB is likely to be calculated as a relatively accurate value. Therefore, the threshold β is set to a relatively small value.

In the dark environment, the intensity of the background light is low. Thus, the intensity ratio between the reflected light and the background light becomes large, that is, the S/N ratio is good and the intensity of the reflected light from the object OB can be accurately determined, which allows the distance to the object OB to be accurately determined. Therefore, in the dark environment, the differences ΔR and ΔL are likely to be calculated as relatively accurate values. The threshold values α and γ are set to small values. On the other hand, the background light intensity may not be accurately determined due to low background light intensity. The difference ΔB is likely to be calculated as a relatively inaccurate value. Therefore, in this case, the threshold β is set to a relatively large value.

The object detection device 50 of the fourth embodiment described above provides similar advantages to those provided by the object detection device 50 of the first embodiment. When the background light intensity is high, i.e., in the bright environment, the reflected light intensity can not be acquired with high accuracy due to the higher noise compared to when the background light intensity is low, and distances can not be acquired with high accuracy. Therefore, when the background light intensity is high, only less accurate images can be acquired as the reflection intensity image and distance image compared to when the background light intensity is low. On the other hand, in the bright environment, the intensity of the background light can be determined more accurately than in the dark environment, and a highly accurate image can be acquired as the background light image. Therefore, according to the object detection device 50 of the fourth embodiment, when the background light intensity is high, the thresholds for the reflection intensity image and the distance image, which are acquired as less accurate images, are set larger than when the intensity is low, and the threshold for the background light image, which is acquired as a highly accurate image, is set smaller. This allows the association process to be performed with high accuracy.

E. Other Embodiments (E1) In each of the embodiments set forth above, the three types of images, i.e., the reflection intensity image, the background light image, and the distance image, may be used to perform a road surface determination process, the clustering process, and the association process, but only some of these three processes may be performed.

(E2) In the association process of each embodiment, whether to associate the result of tracking in the previous frame image and the result of clustering in the current frame image with each other is determined using the difference (each of ΔR, ΔB, and ΔL) between the average of pixel values included in the result of tracking in the previous frame image and the average of pixel values included in the result of clustering in the current frame image, but the present disclosure is not limited thereto. For example, whether to associate the result of tracking in the previous frame image and the result of clustering in the current frame image with each other may be determined using any parameters or combination of parameters that indicate amounts of characteristics of pixel values, such as the median, maximum, minimum, variance, or histogram of the pixel values, for each of the result of tracking in the previous frame image and the result of clustering in the current frame image. For example, as to the histogram, differences in frequency at respective unit times in the frame period are summed up for each of the previous and current frame images. If the total value of the acquired differences (total difference) is less than a threshold set for each of the previous and current frame images, the result of tracking in the previous frame image and the result of clustering in the current frame image may be associated with each other. Otherwise, the result of tracking in the previous frame image and the result of clustering in the current frame image may not be associated with each other.

(E3) In the second embodiment, in the bright environment, the weighting factors for the first and third score maps are set to be less than the initial value and the weighting factor for the second score map is set to be greater than the initial value, but the present disclosure is not limited thereto, The weighting factors for the first and third score maps may be set in any manner such that the weighting factors for the first and third score maps are greater than the weighting factors for the second score map. Similarly, in the dark environment, the weighting factors for the first and third score maps may be set in any manner such that the weighting factors for the first and third score maps are less than the weighting factor for the second score map.

(E4) In the second embodiment, whether the brightness environment is the bright environment is determined for the entire image, but whether the brightness environment is the bright environment may be determined for each partial region in the image. Then, the weighting factor may be set according to the brightness environment determined for each partial region. For example, if some partial regions in the image represent a shade of a building and the other partial regions all represent a region that is illuminated with sunlight, the weighting factors for the first score map (reflection intensity image) and the third score map (distance image) for the shade region may be set to a weighting factor a, and the weighting factor for the second score map (background light image) for the shade region may be set to a weighting factor b, and the weighting factors for the first to third score maps (reflection intensity image, background light image and distance image) for the other regions are set to a weighting factor c. The weighting factors a, b, and c may be set such that the relationship a>c>b is met.

(E5) In the second embodiment, instead of applying the weighting factors to the first to third score maps, each input image may be normalized in advance, the first to third score maps may be generated, and the total score map may be generated without applying the weighting factors. As a method of such normalization, for example, a range of pixel values that may be taken in each image according to the brightness environment may be normalized to a range from 0 to 255. Specifically, if the range of possible pixel values of the background light is a range from 1 to 1000, in the bright environment, the pixel values may be normalized by performing a transformation such that the lowest value of 1 becomes 0 and the highest value of 1000 becomes 255. In the dark environment, the values may be normalized by performing a transformation such that the lowest value 1 becomes 0 and the highest value 300 becomes 255.

(E6) The second embodiment and the third embodiment may be combined. For example, in the weighting setting process of the second embodiment, steps S106 and S107 in the object detection process of the third embodiment are performed after steps S320 and S325. For example, if the contrast-related values of all images are equal to or greater than the contrast threshold, the weighting factors set at steps S320 and S325 may be left as they are, and if the contrast-related value of at least one of the images is less than the contrast threshold, the weighting factors set at steps S320 and S325 may be further multiplied by a predefined factor of less than one. Thus, the weighting factors are decreased for images having low contrast-related values, and the total score map (total likelihood) can be decreased. Therefore, even if an image unsuitable for object detection is acquired due to backlighting in a certain frame period, the total score map of such an image can be decreased to inhibit erroneous detection of objects from such an image.

(E7) In the third embodiment, at step S107, the threshold processing may be performed for each of the three types of information, and only the information above the threshold value may be used in a later stage of processing. Also, in the third embodiment, at step S107, if the contrast-related value is less than the contrast threshold for all images, the user may be notified thereof. Any notification method may be adopted, such as displaying an error message on a display device provided on an instrument panel of the vehicle 500, outputting a warning sound or a warning message from a speaker, or lighting a specific lamp.

(E8) In each of the second and third embodiments, the number of light receptions indicating the intensity of the background light image in the previous frame period is used as the information (i) among the intensity-related information used to determine the brightness environment, but the present disclosure is not limited thereto. For example, the number of light receptions indicating the intensity of the background light image in the next previous (or further preceding) frame period may be used. For example, the background light intensity may be acquired immediately before ranging, or a statistical value, such as the average, sum, median, or variance of the intensities of the background light images over a plurality of frame periods before the previous frame, may be used.

(E9) In each of the above second and third embodiments, the intensity-related information used to determine the brightness environment includes a total of four pieces of information (i) to (iv), but the present disclosure is not limited thereto. For example, it may be configured that a user visually determines the brightness environment and inputs the determination result to the vehicle 500 via a user interface. In such a configuration, the information indicating the brightness environment input from the user interface corresponds to the intensity-related information. For example, some of the information (i) to (iv) may be omitted. For example, the volume or pitch of sound acquired by a microphone mounted to the vehicle 500 may be used as the intensity-related information. In such a configuration, for example, if the intensity of sound is higher than the threshold intensity, it may be estimated to be daytime and the brightness environment may be determined as the bright environment, and if the intensity of sound is below the threshold intensity, it may be estimated to be night-time and the brightness environment may be determined as the dark environment.

(E10) The object detection device 50 in each of the above-described embodiments may be applied to the following devices. For example, the object detection device 50 may be applied to a ranging device for measuring the distance to the object OB. For example, the object detection device 50 may be applied to a route generating device for generating a travel route of the vehicle 500. In such a configuration, the distance to the object OB detected by the object detection device 50 may be used to generate a route that avoids obstacles on the road being traveled. The object detection device 50 may also be applied to an autonomous driving control device. In such a configuration, the distance to the object OB detected by the object detection device 50 may be used to determine the speed and the amount of steering of the vehicle 500. For example, the object detection device 50 may be applied to a detection result display device for displaying the distance to the object OB to an occupant of the vehicle 500. In such a configuration, the occupant of the vehicle 500 can visually confirm the distance to an object present ahead of the vehicle 500. The object detection device 50 may also be applied to a remote information acquisition device for notifying a remote operation control device of a surrounding situation of the vehicle 500. In such a configuration, in addition to the information about the distance to the object OB, the distance image and the background light image may be transmitted to the remote operation control device (e.g., a server device) on the operator side that remotely operates the vehicle 500. The object detection device 50 may also be fixedly installed instead of being mounted to the vehicle 500. For example, the object detection device 50 may be mounted to a monitoring camera (fixed-point camera) to acquire images and measure the distance to the object OB.

(E11) The configuration of the object detection device 50 in each of the above-described embodiments is only an example and may be modified in various ways. For example, in each of the second and third embodiments, the brightness environment is classified into two brightness levels, but may be classified into any number of brightness levels. In addition, the number of macro pixels included in each pixel G and the number of light receiving elements 201 included in each macro pixel may be any number. Any light receiving element other than the SPAD, such as an avalanche photodiode (APD), may be used as the light receiving element 201.

(E12) In the above-described embodiments and modifications, the object detection device 50 and its method described in the present disclosure may be implemented by a dedicated computer including a processor and a memory programmed to execute one or more functions (e.g., functions of functional blocks 30, 40, 211-214, 220, 230, 240, 250, 260, 270 illustrated in FIG. 2, and 30*a* illustrated in FIG. 8) embodied by computer programs. Alternatively, the object detection device 50 and its method described in the present disclosure may be implemented by a dedicated computer including a processor formed of one or more dedicated hardware logic circuits, or may be implemented by one or more dedicated computers including a combination of a processor and a memory programmed to execute one or more functions and a processor formed of one or more dedicated hardware logic circuits. The computer programs may be stored, as instructions to be executed by a computer, in a non-transitory, tangible computer-readable storage medium.

The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

What is claimed is:

1. An object detection device for detecting an object, comprising:
   a single sensor unit including a light emitting unit configured to emit illumination light, and a light receiving unit including a two-dimensional array of a plurality of light receiving elements on a light receiving surface for receiving light including reflected light of the illumination light, the light receiving unit being configured to output a light reception signal in response to a light reception state of a set of the light receiving elements in each pixel, the set of the light receiving elements within each predefined pixel region forming one pixel, the sensor unit being configured to, based on the light reception signals, acquire first information indicating reception intensity of the reflected light at each pixel, second information indicating reception intensity of background light that is light other than the reflected light, at each pixel, and third information indicating a distance to the object at each pixel as a pixel value of the pixel; and
   a detection unit configured to use the pixel value of each pixel to detect the object, the detection unit being configured to use all of the first to third information included in the acquired pixel values of the respective pixels to detect the object.

2. The object detection device according to claim 1, wherein
   the detection unit is configured to detect the object by contrasting the first to third information with model information that represents models of the first to third information in the presence of the object.

3. The object detection device according to claim 2, wherein
   the detection unit is configured to contrast the first information with the model information for the first information to acquire, for each pixel, a first likelihood indicating a likelihood of the object being present, contrast the second information with the model information for the second information to acquire, for each pixel, a second likelihood indicating a likelihood of the object being present, contrast the third information with the model information for the third information to acquire, for each pixel, a third likelihood indicating a likelihood of the object being present, acquire a total likelihood by calculating a weighted sum of the first to third likelihoods for each pixel, and uses the acquired total likelihood to detect the object.

4. The object detection device according to claim 3, wherein
   the detection unit is configured to acquire intensity-related information related to the reception intensity of the background light, and
   the detection unit is configured to, in response to the reception intensity of the background light indicated by the acquired intensity-related information being high, set a smaller weighting factor for each of the first likelihood and the third likelihood and a larger weighting factor for the second likelihood, as compared to in response to the reception intensity of the background light indicated by the acquired intensity-related information being low.

5. The object detection device according to claim 1, wherein
   the detection unit is configured to use the first to third information to perform at least one of a road surface determination process and a clustering process that associates a plurality of range points with each other.

6. The object detection device according to claim 5, wherein
   the sensor unit is mountable and usable in a vehicle,
   the sensor unit is configured to acquire the first to third information as frame images respectively corresponding to the first to third information for each predefined frame period, and
   the detection unit is configured to perform an association process on each of the first to third information to associate a result of the clustering process performed on a current frame image acquired during a current frame period and a result of the clustering process performed on a previous frame image acquired during a previous frame period with each other using at least pixel values of each of the current and previous frame images, the result of the clustering process performed on the previous frame image being a result of tracking process that associates the result of the clustering process performed on the previous frame image and a result of the clustering process performed on a next previous image acquired during a next previous frame period with each other.

7. The object detection device according to claim 6, wherein
   the detection unit is configured to perform the clustering process and the association process, and in the association process, for each of the first to third information, acquire a feature value of the pixel values for the result of the clustering process performed on each of current and previous frame images, acquire a difference between the feature values for the current and previous frame images, in response to the difference for each of the first to third information being less than a respective predefined threshold, associate the result of the clustering process performed on the current frame image and the result of the tracking process performed on the previous frame image with each other.

8. The object detection device according to claim 7, wherein
   the detection unit is configured to acquire intensity-related information related to the reception intensity of background light,
   the detection unit is configured to variably set the threshold for each of the first to third information, and
   the detection unit is configured to, in response to the reception intensity of the background light indicated by the acquired intensity-related information being high, set the threshold for each of the first and third information to a smaller value and set the threshold for the second information to a larger value, as compared to in response to the reception intensity of the background light indicated by the acquired intensity-related information being low.

9. The object detection device according to claim 7, wherein,
   for each of the first to third information, the feature value is at least one of an average and a histogram of the pixel values of the pixels.

10. The object detection device according to claim 1, wherein
- the sensor unit further includes a contrast-related value calculator configured to acquire the first to third information as frame images for each predefined frame period, and calculates a contrast-related value for each of the frame images corresponding to the acquired first or third information,
- the detection unit is configured to, given the three frame images respectively corresponding to the acquired first to third information, in response to the contrast-related value calculated for each of the three frame images being equal to or greater than a predetermined contrast threshold, detect the object using all of the acquired three frame images, and in response to at least one of the acquired three frame images being less than the predetermined contrast threshold, not perform detection of the object using all of the acquired three frame images.

11. The object detection device according to claim 1, wherein
- the sensor unit is configured as a ranging device that measures the distance to the object.

12. The object detection device according to claim 1, wherein
- each of the light receiving elements comprises a single photon avalanche diode (SPAD) that outputs an output signal indicating incidence of light as the light reception signal.

* * * * *